United States Patent [19]
Lee et al.

[11] Patent Number: 5,974,197
[45] Date of Patent: Oct. 26, 1999

[54] LOOP FILTER AND LOOP FILTERING METHOD

[75] Inventors: Yung-lyul Lee; Hyun-wook Park, both of Seoul, Rep. of Korea

[73] Assignee: Samsung Electronics Co., Ltd., Kyungki-do, Rep. of Korea

[21] Appl. No.: 08/892,226

[22] Filed: Jul. 14, 1997

[30] Foreign Application Priority Data

Jan. 29, 1997 [KR] Rep. of Korea .......... 97-2666

[51] Int. Cl.$^6$ .............. G06K 9/40; G06K 9/46
[52] U.S. Cl. .......... 382/268; 382/199; 382/205
[58] Field of Search .................... 382/266, 205, 382/260, 270, 265, 199, 195, 261, 268, 200, 206

[56] References Cited

U.S. PATENT DOCUMENTS

| | | | |
|---|---|---|---|
| 5,784,499 | 7/1998 | Kuwahara | 382/264 |
| 5,784,500 | 7/1998 | Homma | 382/268 |
| 5,796,875 | 8/1998 | Read | 382/261 |
| 5,812,702 | 9/1998 | Kundu | 382/261 |
| 5,818,964 | 10/1998 | Itoh | 382/270 |

FOREIGN PATENT DOCUMENTS 0 613 302 A2  2/1994  European Pat. Off. ......... H04N 7/13

*Primary Examiner*—Scott Rogers
*Attorney, Agent, or Firm*—Sughrue, Mion, Zinn, Macpeak & Seas, PLLC

[57] ABSTRACT

A loop filtering method and a loop filter therefor are provided. The loop filtering method includes the steps of: (a) generating a binary edge map by comparing a value obtained by operating each pixel of the image data using a predetermined one-dimensional gradient operator with a predetermined threshold value; (b) applying a filter window with a predetermined size to the generated binary edge map to check whether an edge information exists within the filter window; (c) filtering the pixel value of the corresponding filter window by a pixel using predetermined first weights to generate a new pixel value if it is determined in the step (b) that the edge information does not exist; and (d) filtering the pixel value of the corresponding filter window by a pixel using predetermined second weights to generate a new pixel value if it is determined in the step (b) that the edge information exists, wherein the filtering is not performed in the step (d) if the pixel at the center of the filter window is edge information. Therefore, blocking effect and ringing noise are removed from the image passed through block-based compression restoration, improving the quality of the restored image.

13 Claims, 4 Drawing Sheets

AVERAGE FILTERING

WEIGHTED FILTERING

LOOP FILTER AND LOOP FILTERING METHOD

BACKGROUND OF THE INVENTION

The present invention relates to data filtering, and more particularly, to a loop filter for reducing blocking effect and ringing noise, and to a loop filtering method.

Generally, picture coding standards such as MPEG of the International Standardization Organization (ISO) and H.263 of the International Telecommunication Union (ITU) use block-based motion estimation and discrete cosine transform (DCT) of blocks. Block-based coding causes a blocking effect and ringing noise, as is well known, when an image is highly compressed. Typical blocking effects include grid noise in the homogeneous area having relatively similar pixel values between adjacent pixels and staircase noise, in which an image edge is shown in the shape of a staircase along the edge of the image. Also ringing noise, a typical Gibb's phenomenon, occurs when a DCT coefficient is truncated by quantization in order to highly compress the image.

In the case of grid noise, traces caused by the process performed based on the block appear at the border between blocks when the compressed data is restored for display on a screen, so that the border between blocks can be noticed by a user. In the case of staircase noise, the edge of the image has the shape of a staircase, such that the bumpy edge of the image is noticed by a user. Also, ringing noise causes a problem in that a plurality of pictures are shown as being overlapped in intervals.

Methods have been proposed to solve the blocking effect and the ringing noise occurring during a block-based coding process. First, according to H.261, the blocking effect is decreased using a simple 3×3 low pass filter as a loop filter. Also, a simple edge loop filter has been suggested for reducing the blocking effect and mosquito noise. The edge loop filter linearizes values of two adjacent pixels positioned at the border of blocks to replace two pixel values by the linearized values. However, the edge loop filter cannot reduce the ringing noise even though the blocking noise is reduced. Also, a non-linear filter adopting a binary index has been suggested for reducing the ringing noise. However, the non-linear filter also cannot solve the problem related to the blocking effect.

SUMMARY OF THE INVENTION

To solve the above problems, it is an object of the present invention to provide a loop filter and a loop filtering method for reducing blocking effect and ringing noise in a high compression encoding system, in which simple low pass filtering is performed for simultaneously reducing the blocking effect and the ringing noise occurring when block-based coding is performed.

According to an aspect of the present invention, there is provided a loop filtering method for reducing a blocking effect and ringing noise of image data, the loop filtering method comprising the steps of: (a) generating a binary edge map by comparing a value obtained by operating each pixel of the image data using a predetermined one-dimensional gradient operator with a predetermined threshold value; (b) applying a filter window with a predetermined size to the generated binary edge map to check whether an edge information exists within the filter window; (c) filtering the pixel value of the corresponding filter window by a pixel using predetermined first weights to generate a new pixel value if it is determined in the step (b) that the edge information does not exist; and (d) filtering the pixel value of the corresponding filter window by a pixel using predetermined second weights to generate a new pixel value if it is determined in the step (b) that the edge information exists, wherein the filtering is not performed in the step (d) if the pixel at the center of the filter window is edge information.

Preferably, the one-dimensional gradient operator used in the step (a) includes a horizontal gradient operator of 1×2 size, having a weight of (1,−1), and a vertical gradient operator of 2×1 size, having a weight of (1,−1).

Preferably, the step (a) includes the sub-steps of: (a-1) receiving image data in a predetermined block unit; (a-2) performing a gradient operation with respect to each pixel of the input image block using the one-dimensional gradient operator; and (a-3) generating the binary edge map information through a comparison with a predetermined first threshold value if the gradient operated pixel belongs to a predetermined area near a block boundary, or through a comparison with a predetermined second threshold value, if otherwise.

According to another aspect of the present invention, there is provided a loop filter comprising: an image storing unit for temporarily storing image data; a gradient operator for performing one-dimensional gradient operation in horizontal and vertical directions using a one-dimensional gradient operator to find out edge pixels by receiving the image data in a block unit having a predetermined size from the image storing unit; an area determining unit for determining whether the pixels which have been horizontal or vertical one-dimensional gradient operated belong to a boundary area or a global area; a boundary area binary edge information generator for generating edge information if a value obtained by the one-dimensioal gradient operation is greater than a predetermined first threshold value, or non-edge information, if otherwise, when it is determined by the area determining unit that the image data passed through the horizontal or vertical one-dimensional gradient operator belongs to the boundary area; a global area binary edge information generator for generating edge information if a value obtained by the one-dimensional gradient operation is greater than a predetermined second threshold value, or non-edge information, if otherwise, when it is determined by the area determining unit that the image data passed through the horizontal or vertical one-dimensional gradient operator belongs to the global area; an OR-processing unit for performing an OR operation to generate binary edge map information with respect to information output via the area determining unit and the boundary area binary edge information generator, and information output via the area determining unit and the global area binary edge information generator, after the vertical and horizontal one-dimensional gradient operations are performed with respect to a pixel; a filter determiner for storing the binary edge map information output from the OR-processing unit and classifying the input image data into one of an edge area including at least one piece of edge information and a homogeneous area without having edge information according to the binary edge map information; an average filter for performing a predetermined average filtering with respect to the pixels of a filter window classified into the homogeneous area by the filter determiner; and a weighted filter for performing a predetermined weighted filtering with respect to the pixels of a filter window classified into the edge area by the filter determiner.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
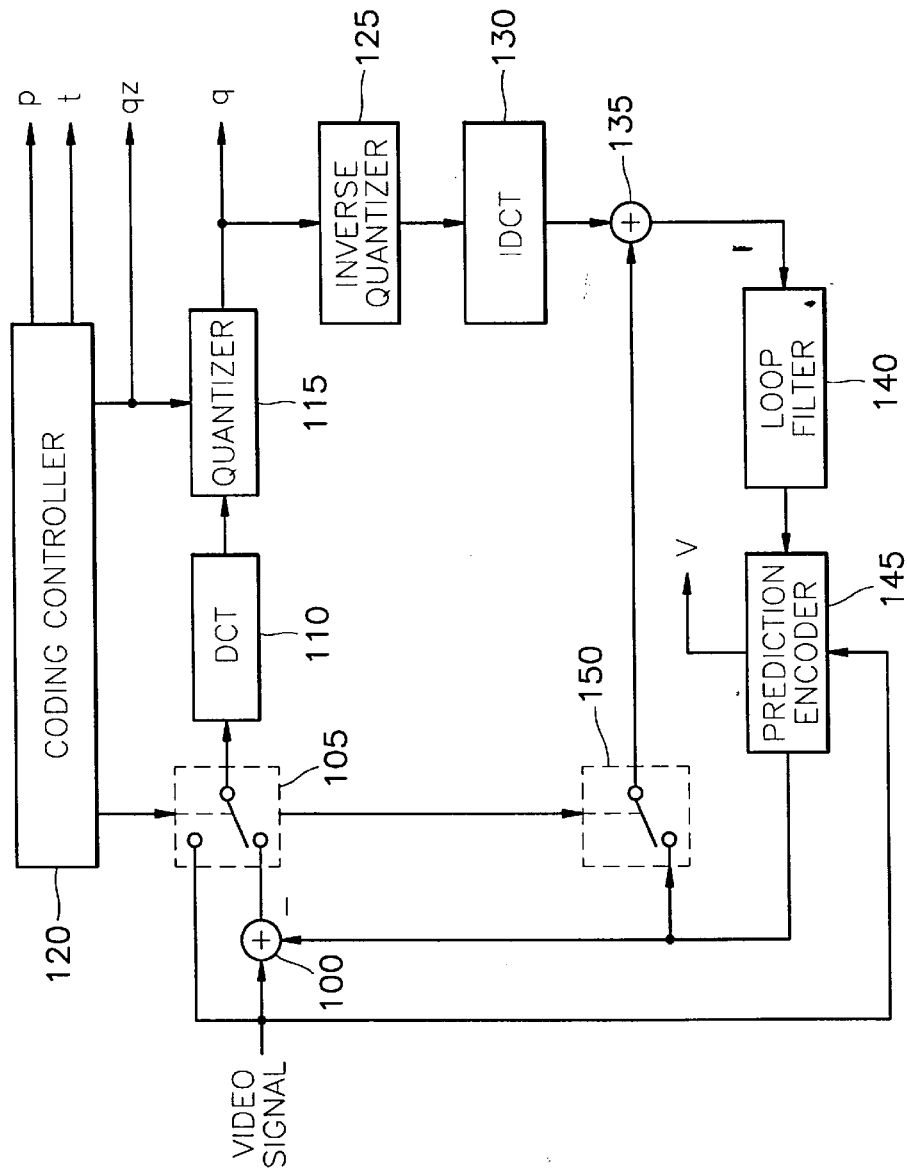
FIG. 1 is a block diagram showing the structure of an encoder to which a loop filter of the present invention can be applied as a preferred embodiment.

In FIG. 1 there is shown an encoder of the H.263 type related to a high compression encoding system including a motion compensation-prediction encoder. Except for a loop filter 140 of the present invention, all other blocks illustrated are well known to those skilled in the art, so that only a brief description of those operation of the blocks will be given.

In FIG. 1, a video signal is input to a subtractor 100, a first switch 105 and a prediction encoder 145. The subtractor 100 subtracts a motion-estimated error signal output from the prediction encoder 145 from the input video signal, and the output signal of the subtractor 100 is applied to a first switch 105. The first switch 105 selects the input video signal or the output signal of the subtractor 100 according to the control of a coding controller 120, and then the selected signal is applied to a discrete cosine transformer (DCT) 110. The coding controller 120 controls the first switch 105 such that the input video signal is applied to the DCT 110 in an intra coding mode, and the output signal of the subtractor 100 is applied to the DCT 110 in an inter coding mode. The signal passing through the DCT 110 and a quantizer 115 is applied to an inverse quantizer 125 and a video multiplexing encoder (not shown). The inverse quantizer 115 inversely quantizes the applied signal and applies the result to an inverse DCT (IDCT) 130. The signal transformed by the IDCT 130 and the signal output from the prediction encoder 145 which is switched by a second switch 150 are added in an adder 135 to be applied to a loop filter 140. Here, the blocking effect and ringing noise are removed by the loop filter 140. The prediction encoder 145 performs a motion estimation by receiving the signal filtered by the loop filter 140 and the input video signal and outputs a motion-predicted error signal. The prediction encoder 145 outputs a motion vector (V) obtained through the motion compensation predictive coding to the video multiplexing encoder.

The output signal of the prediction encoder 145 is provided to the subtractor 100 and the second switch 150. The second switch 150 is controlled by the coding controller 120. The coding controller 120 controls the second switch 150 such that the application of a signal processed by the prediction encoder 145 is not supplied to the adder 135 in the intra coding mode, and but is provided to the adder 135 in the inter coding mode. The coding controller 120 for controlling the above-described operation of the encoder shown in FIG. 1 generates an intra/inter mode information flag (p) representing whether intra frame coding or inter frame coding is to be performed, a signal (qz) representing quantization characteristic designating information, and a flag (t) capable of identifying transmission or non-transmission. Also, a signal (q) representing the level of a transform coefficient is generated by the quantizer 115.

Figure 2:
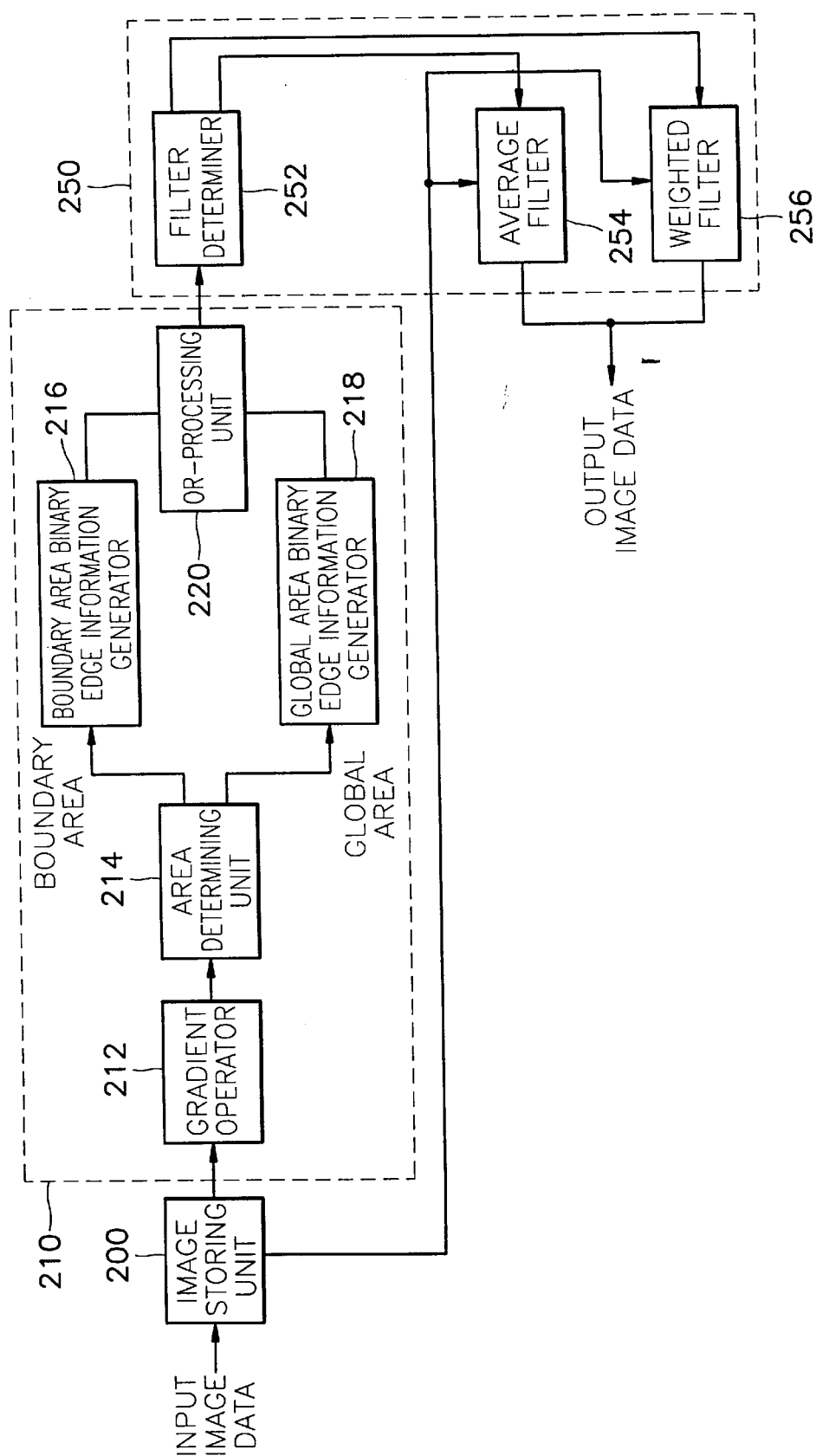
FIG. 2 is a block diagram showing the structure of the loop filter shown in FIG. 1.

FIG. 2 is a block diagram illustrating the loop filter 140 shown in FIG. 1. The loop filter shown in FIG. 2 includes an image storing unit 200, a binary edge map information generator 210 and a signal adaptive filtering portion 250.

The image storing unit 200 temporarily stores the result obtained by adding the image data including the blocking effect and the ringing noise, applied from the IDCT 130 via the adder 35, and a signal selectively output from the prediction encoder 145. The binary edge map information generator 210 receives an image signal composed of 16×16 pixels in a 16×16 size macroblock unit from the image storing unit 200 to generate binary edge map information in an 8×8 size block unit using a one-dimensional gradient operator. The binary edge map information generator 210 includes a gradient operator 212, an area determining unit 214, a boundary area binary edge map information generator 216, a global area binary edge information generator 218, and an OR-processing unit 220. The signal adaptive filtering portion 250, filters the 16×16 binary edge map information generated by the binary edge map information generator 210 and includes a filter determiner 252, an average filter 254 and a weighted filter 256. The size of the macroblock and that of the block are not limited to those stated in the above embodiment.

The gradient operator 212 receives an image signal composed of 16×16 pixels on a 16×16 size macroblock basis from the image storing unit 200 to perform a one-dimensional gradient operation in the horizontal and vertical directions using the one-dimensional gradient operators in order to find edge pixels. Here, the one-dimensional gradient operators having a weight of (1,−1) include a horizontal one-dimensional operator of 1×2 size, which is used for the gradient operation in the horizontal direction, and a vertical one-dimensional gradient operator of 2×1 size, which is used for the gradient operation in the vertical direction.

The area determining unit 214 determines whether the pixels passed through the horizontal or vertical one-dimensional gradient operation belong to the boundary area or global area. The pixels are classified into the boundary area and the global area for the purpose of removing the blocking effect by using different threshold values depending on the area when generating the binary edge information.

In the case where it is determined by the area determining unit 214 that the image data operated by the horizontal or vertical one-dimensional gradient operator belongs to the boundary area, the boundary area binary edge information generator 216 generates edge information if the resultant value of the one-dimensional gradient operation is greater than a predetermined threshold value, or non-edge information if the resultant value is equal to or less than the predetermined threshold value. Here, preferably, the predetermined threshold value is equal to 200.

In the case where it is determined by the area determining unit 214 that the image data operated by the horizontal or vertical one-dimensional gradient operator belongs to the global area, the global area binary edge information generator 218 generates edge information if the resultant value is greater than a predetermined threshold value, or non-edge information if the resultant value is equal to or less than the predetermined threshold value. Here, preferably, the predetermined threshold value is equal to 10.

The OR-processing unit 220 generates edge information through an OR operation if the values operated by the vertical and horizontal one-dimensional gradient operators with respect to a pixel differ from information output via the area determining unit 214 and the boundary area binary edge information generator 216, and information output via the area determining unit 214 and the global area binary edge information generator 218.

Figure 3:
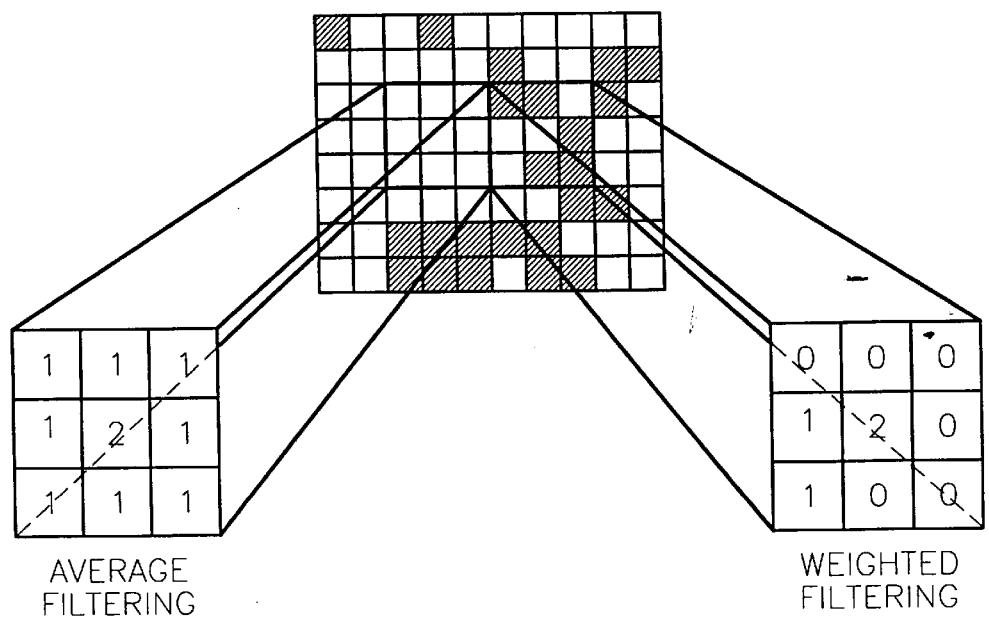
FIG. 3 is a diagram showing a binary edge map generated from a binary edge map information generator and low pass filtering used in a signal adaptive filtering portion.

FIG. 3 shows a binary edge map generated from the binary edge map information generating portion 210 and low pass filtering used in the signal adaptive filtering portion 250.

The filter determiner 252 stores the binary edge map information provided from the OR-processing unit 220. The input image data is classified into an edge area and a homogeneous area by the binary edge map. According to the present invention, the filter determiner 252 is used for the above classification. The average filter 254 and the weighted filter 256 according to the embodiment of the present invention use a 3×3 size filter window, respectively. Thus, a filter window used in the filter determiner 252 is also in 3×3 size. The filter determiner 252 determines whether the binary edge map in which the filter window is located belongs to the edge area or the homogeneous area, based on the edge values within the filter window having the predetermined size, i.e., 3×3. If it is determined that the binary edge map belongs to the homogeneous area, the filter determiner 252 outputs location data with respect to the center of the filter window used for the decision to the average filter 254. On the contrary, if it is determined that the binary edge map belongs to the edge area, the filter determiner 252 outputs the binary edge map information within the filter window used for the decision and the location data to the center thereof to the weighted filter 256. Here, the center of the filter window is the point where the pixel value thereof is replaced by a new value through a filtering process.

Figure 4A:
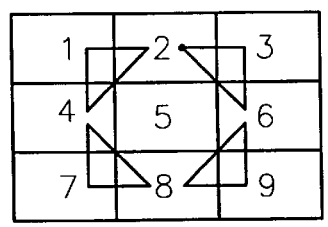
FIG. 4A is a diagram showing a filter window for a 2-dimensional 3×3 filter.
Figure 4B:
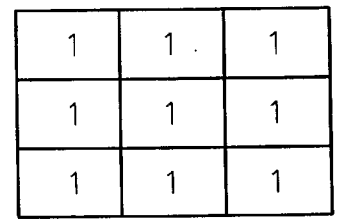
FIGS. 4B and 4C are diagrams showing weights for the 2-dimensional 3×3 average filter.
Figure 4C:
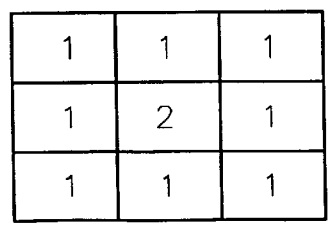

FIGS. 4A and 4C relate to two-dimensional 3×3 filters. In detail, FIG. 4A shows a filter window for a 3×3 filter, FIG. 4B shows weights for a 3×3 average filter, and FIG. 4C shows weights for a 3×3 weighted filter. In the filter window shown in FIG. 4A, the point having a filter weight index value of "5" represents the center of the filter window.

The operations of the average filter 254 and the weighted filter 256, as a type of two-dimensional low pass filter, will now be described in detail. If location data with respect to the center point is input, the average filter 254 reads the pixel values required for calculating the filtered pixel value of the center point from the image storing unit 200. Then, the average filter 254 calculates the filtered pixel values using the read pixel values and the weights shown in FIG. 4B. The calculated filtered pixel values are used as pixel values altered with respect to the center point. The weighted filter 256 performs the filtering operation based on the binary edge map information provided from the filter determiner 252 and the location data with respect to the center point. The operation of the weighted filter 256 will be described through the following example for a better understanding. If the center point "5" belongs to an edge point, the weighted filter 256 does not perform the filtering operation with respect to the center point. If the edge point (or edge points) is within the 3×3 filter window except the center point, the weighted filter 256 performs the filtering operation using the weights shown in FIG. 4C. If arbitrary edge points are at the points 2 and 6, 6 and 8, 4 and 8, or 2 and 4 of FIG. 4A, the weights of both the edge points and the outer neighboring points are "0". The image data passed through the signal adaptive filtering process is output from the average filter 254 and the weighted filter 256.

Figure 5:
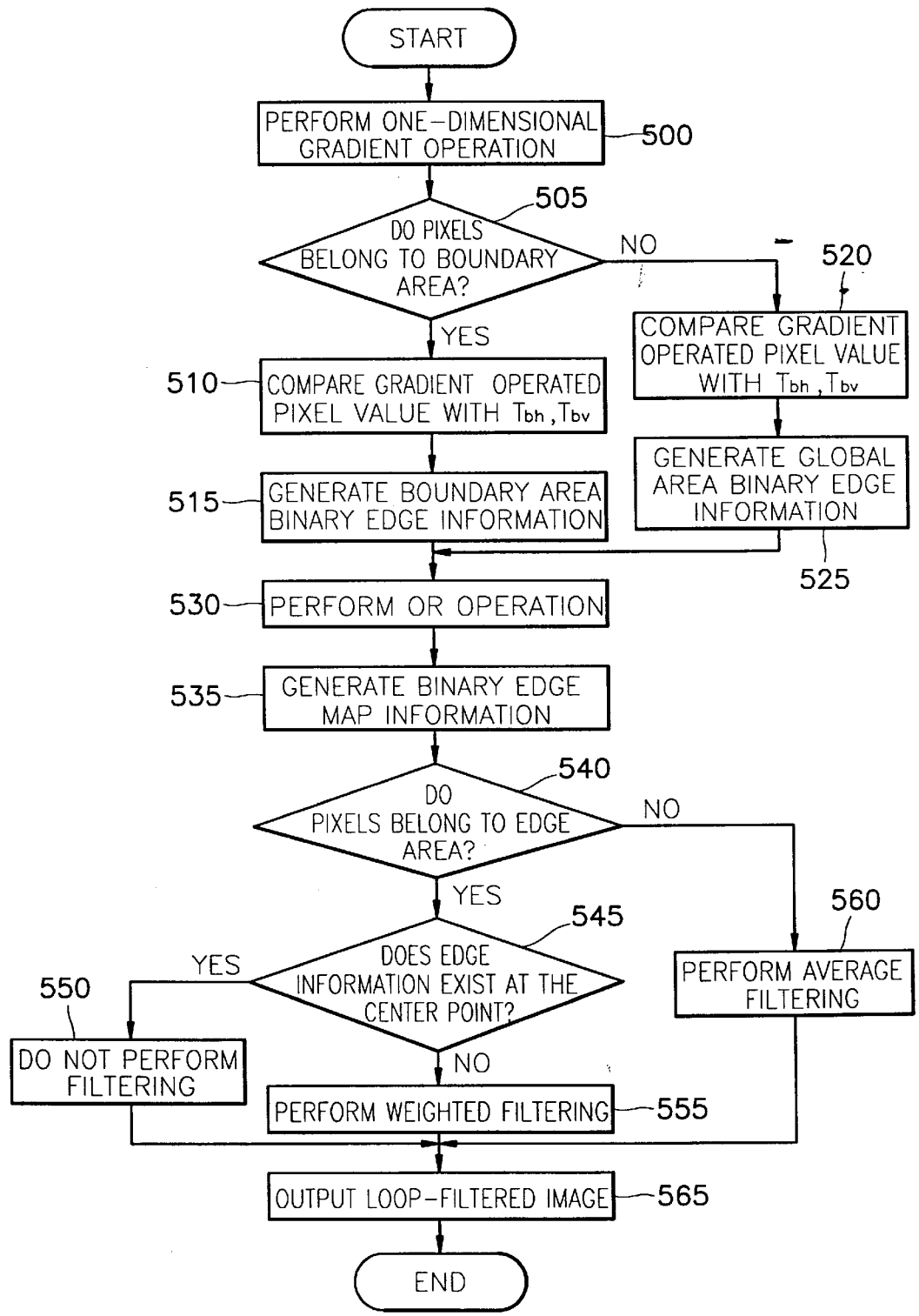
FIG. 5 is a flowchart illustrating a loop filtering method according to the present invention.

A loop filtering method of the present invention will now be described based on the above structure. FIG. 5 is a flowchart illustrating the loop filtering method according to the present invention. First, in the intra mode, the image data having the blocking effect and the ringing noise, applied from the IDCT 130, is received from the image storing unit 200, in units of a 16×16 size macroblock composed of 16×16 pixels, and the one-dimensional gradient operation is performed in units of an 8×8 size block using the horizontal or vertical one-dimensional gradient operator (step 500). In detail, the input image data is received in units of 16×16 size macroblock composed of 18×18 pixels. This is because the pixels of the neighboring blocks are required for processing the pixels of the boundary even if a target processing unit is a 16×16 size macroblock.

Then, the area determining unit 214 determines whether the pixels that have passed through the gradient operation belong to the boundary area or the global area (step 505). If the pixels belong to the boundary area, the boundary area binary edge information generator 216 compares the gradient-operated value of the pixel with a predetermined horizontal or vertical boundary area threshold value $T_{bh}$ or $T_{bV}$ (step 510). When the horizontal gradient operator is applied to the pixels, the boundary area binary edge information generator 216 generates edge information "1" if the resultant value of the gradient operation is greater than $T_{bh}$, otherwise non-edge information "0" is generated. In the same manner, when the vertical gradient operator is applied to the pixels, the boundary area binary edge information generator 216 generates edge information "1" if the resultant value of the gradient operation is greater than $T_{bV}$, otherwise non-edge information "0" is generated (step 515). Here, it is assumed that $T_{bV}$ and $T_{bh}$ are set to 200.

On the other hand, if the pixels that have passed through the gradient operation belong to the global area, the global area binary edge information generator 218 compares the gradient-operated value of the pixel with a predetermined horizontal or vertical global area threshold value $T_{gh}$ or $T_{gv}$ (step 520). When the horizontal gradient operator is used, the global area binary edge information generator 218 generates edge information "1" if the resultant value of the gradient operation is greater than $T_{gh}$, otherwise non-edge information "0" is generated. In the same manner, when the vertical gradient operator is used, the global area binary edge information generator 218 generates edge information "1" if the resultant value of the gradient operation is greater than $T_{gv}$, otherwise non-edge information "0" is generated (step 525). Here, it is assumed that $T_{gv}$ and $T_{gh}$ are set to 10.

As above, if the binary edge information generated using the horizontal and vertical gradient operators are different from each other, an OR operation is performed by the OR-processing unit 220 (step 530) to generate edge information "1". The above steps are performed per pixel to generate binary edge map information in a mackblock unit (step 535).

The above generated binary edge map information is filtered by a 3×3 size filter. The filtering process will now be described in detail. First, a filtering area is set with respect to the image data of an 8×8 size per pixel using a 3×3 size filter, and then the filter determiner 252 checks whether a pixel representing edge information exists within the filtering area (step 540). If edge information exists, it is checked whether the pixel at the center point of the filter represents edge information (step 545). If the pixel at the center point of the filter represents edge information, the corresponding pixel value of the original input image data is used as it is without filtering (step 550). Otherwise, weighted filtering is performed using the weighted filter 256 (step 555). On the other hand, if it is determined in step 540 that pixels representing edge information do not exist within the filtering area, average filtering is performed using the average filter 254 (step 560). As a result, the filtered image data forms the image data loop-filtered in units of a 16×16 size macroblock. The loop filtering is performed by repeating the above processes with respect to a frame image (step 565).

On the other hand, the inter coding can be performed without loop filtering according to predictive coding information stored in the image storing unit 200 together with the information passed through the IDCT.

The embodiment of the present invention is described in connection with an encoder. However, it will be obvious to those skilled in the art that the loop filter 140 of the present invention can be applied to a decoder as well. Also, the above-described embodiment is described in connection with the H.263 coding standard, however, the loop filter 140 of the present invention can also be applied to MPEG-4 Vertical Model (VM) 3.1 coding standard.

According to the present invention, blocking effect and ringing noise are removed from an image passed through block-based compression restoration, improving the quality of the restored image.

What is claimed is:

1. A loop filtering method for reducing blocking effect and ringing noise of image data, the loop filtering method comprising the steps of:
   (a) generating a binary edge map by comparing a value obtained by operating each pixel of the image data using a predetermined one-dimensional gradient operator with a predetermined threshold value;
   (b) applying a filter window with a predetermined size to the generated binary edge map to determine whether edge information exists within the filter window;
   (c) filtering the pixel value of the corresponding filter window by a pixel using predetermined first weights to generate a new pixel value if it is determined in the step (b) that edge information does not exist; and
   (d) filtering the pixel value of the corresponding filter window by a pixel using predetermined second weights to generate a new pixel value if it is determined in the step (b) that edge information exists, wherein the filtering is not performed in the step (d) if the pixel at the center of the filter window is edge information.

2. A loop filtering method as claimed in claim 1, wherein the filter window is 3×3 in size.

3. A loop filtering method as claimed in claim 1, wherein the one-dimensional gradient operator used in the step (a) includes:
   a horizontal gradient operator of 1×2 size, having a weight of (1,−1); and
   a vertical gradient operator of 2×1 size, having a weight of (1,−1).

4. A loop filtering method as claimed in claim 3, wherein the step (a) includes the sub-steps of:
   (a-1) receiving image data in a predetermined block unit;
   (a-2) performing a gradient operation with respect to each pixel of the input image block using the one-dimensional gradient operator; and
   (a-3) generating the binary edge map information through a comparison with a predetermined first threshold value if the gradient operated pixel belongs to a predetermined area near a block boundary, or through a comparison with a predetermined second threshold value, if otherwise.

5. A loop filtering method as claimed in claim 1, wherein said threshold values comprise a first threshold value that is greater than a second threshold value.

6. A loop filtering method as claimed in claim 1, wherein the one-dimensional horizontal and vertical gradient operator is applied with respect to each pixel of an image block, and an OR operation is performed with respect to each binary value obtained through one-dimensioal horizontal and vertical gradient operations.

7. A loop filtering method as claimed in claim 1, wherein the block is of 16×16 size and the loop filtering is performed in a block unit of 8×8 size.

8. A loop filtering method as claimed in claim 1, wherein said predetermined one-dimensioal gradient operator uses at least two predetermined threshold values.

9. A loop filtering method for reducing a blocking effect and ringing noise of image data, the loop filtering method comprising the steps of:
   (a) generating a binary edge map by comparing a value obtained by operating each pixel of the image data using a predetermined one-dimensional gradient operator with a predetermined threshold value by:
      (a-1) receiving image data in a predetermined block unit;
      (a-2) performing a gradient operation with respect to each pixel of the input image block using the one-dimensional gradient operator; and
      (a-3) generating the binary edge map information through a comparison with a predetermined first threshold value if the gradient operated pixel belongs to a predetermined area near a block boundary, or through a comparison with a predetermined second threshold value, if otherwise:
   (b) applying a filter window with a predetermined size to the generated binary edge map to check whether an edge information exists within the filter window;
   (c) filtering the pixel value of the corresponding filter window by a pixel using predetermined first weights to generate a new pixel value if it is determined in the step (b) that the edge information does not exist; and
   (d) filtering the pixel value of the corresponding filter window by a pixel using predetermined second weights to generate a new pixel value if it is determined in the step (b) that the edge information exists, wherein the filtering is not performed in the step (d) if the pixel at the center of the filter window is edge information.

10. A loop filtering method as claimed in claim 9, wherein the first threshold value is greater than the second threshold value in the step (a-3).

11. A loop filtering method as claimed in claim 9, wherein the one-dimensional horizontal and vertical gradient operations are performed with respect to each pixel of the image block in the step (a-2), and an OR operation is performed with respect to each binary value obtained through the one-dimensional horizontal and vertical gradient operations in the step (a-3).

12. A loop filtering method as claimed in claim 9, wherein the block is of 16×16 size and the loop filtering is performed in a block unit of 8×8 size.

13. A loop filter comprising:
   an image storing unit for temporarily storing image data;
   a gradient operator for performing an one-dimensional gradient operation in horizontal and vertical directions using a one-dimensional gradient operator to find out edge pixels by receiving the image data in a block unit having a predetermined size from the image storing unit;

an area determining unit for determining whether the pixels which have been horizontal or vertical one-dimensional gradient operated belong to a boundary area or a global area;

a boundary area binary edge information generator for generating edge information if a value obtained by the one-dimensional gradient operation is greater than a predetermined first threshold value, or non-edge information, if otherwise, when it is determined by the area determining unit that the image data passed through the horizontal or vertical one-dimensional gradient operator belongs to the boundary area;

a global area binary edge information generator for generating edge information if a value obtained by the one-dimensional gradient operation is greater than a predetermined second threshold value, or non-edge information, if otherwise, when it is determined by the area determining unit that the image data passed through the horizontal or vertical one-dimensioal gradient operator belongs to the global area;

an OR-processing unit for performing an OR operation to generate binary edge map information with respect to information output via the area determining unit and the boundary area binary edge information generator, and information output via the area determining unit and the global area binary edge information generator, after the vertical and horizontal one-dimensioal gradient operations are performed with respect to a pixel;

a filter determiner for storing the binary edge map information output from the OR-processing unit and classifying the input image data into one of an edge area including at least one piece of edge information and a homogeneous area without having edge information according to the binary edge map information;

an average filter for performing a predetermined average filtering with respect to the pixels of a filter window classified into the homogeneous area by the filter determiner; and a weighted filter for performing a predetermined weighted filtering with respect to the pixels of a filter window classified into the edge area by the filter determiner.

* * * * *